(12) United States Patent
Nagpal et al.

(10) Patent No.: US 9,710,582 B1
(45) Date of Patent: Jul. 18, 2017

(54) DELIVERING CIRCUIT DESIGNS FOR PROGRAMMABLE INTEGRATED CIRCUITS

(71) Applicant: Xilinx, Inc., San Jose, CA (US)

(72) Inventors: Sumit Nagpal, Hyderabad (IN);
Siddharth Rele, Navi Mumbai (IN);
Avdhesh Palliwal, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/974,217

(22) Filed: Dec. 18, 2015

(51) Int. Cl.
*G06F 17/50* (2006.01)

(52) U.S. Cl.
CPC .............................. *G06F 17/5045* (2013.01)

(58) Field of Classification Search
USPC ........................................................ 716/102
See application file for complete search history.

(56) References Cited

U.S. PATENT DOCUMENTS 7,574,679 B1 * 8/2009 Gathoo ............... G06F 17/5045
716/100

* cited by examiner

*Primary Examiner* — Eric Lee
(74) *Attorney, Agent, or Firm* — Kevin T. Cuenot (57) ABSTRACT

Implementing a circuit design may include, responsive to a user input selecting a design, executing an implementation script of the design using the processor. Executing the implementation script may generate instructions for generating a circuit design from the design. Responsive to the instructions and using the processor, cores of the design may be automatically instantiated and connected.

20 Claims, 3 Drawing Sheets

DELIVERING CIRCUIT DESIGNS FOR PROGRAMMABLE INTEGRATED CIRCUITS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to providing circuit designs for programmable integrated circuits (ICs) and, more particularly, to providing example designs with flexible configuration options.

BACKGROUND

Integrated circuit (IC) development tools typically provide one or more different circuit designs as examples for users. A user may select an example circuit design from within the IC development tool and implement the example circuit design for use within a programmable IC. With conventional IC development tools, however, the example circuit designs are static and generated with a fixed set of implementation options. The example circuit designs are generated and delivered to the user in this fixed or static format. Users are unable to change any aspects of the example circuit design prior to and/or during generation.

In some cases, depending upon the IC development tool, a user may modify an example circuit design once generated and made available to the user. Such modification typically entails editing the hardware description language (HDL) generated for the example circuit design. Editing the HDL, however, is a manual, time consuming process that requires an understanding of both HDL in general and the inner workings of the example circuit design itself. Adding or removing circuitry, for example, requires the user to manually manage connectivity of circuit blocks, updating core parameterizations, and the like.

SUMMARY

A method of implementing a circuit design may include, responsive to a user input selecting a design, executing an implementation script of the design using a processor. Executing the implementation script may generate instructions for creating a circuit design. The method may also include, responsive to the instructions, automatically instantiating cores of the design and connecting the instantiated cores using the processor.

A non-transitory computer-readable medium has instructions stored thereon which, when executed by a processor, perform a method of implementing a circuit design. The method may include, responsive to a user input selecting a design, executing an implementation script of the design using the processor. Executing the implementation script may generate instructions for creating a circuit design. The method may include, responsive to the instructions, automatically instantiating cores of the design and connecting the instantiated cores using the processor.

A system may include a processor programmed to initiate executable operations. The executable operations may include the various operations described within this disclosure for implementing a circuit design from a design.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description with reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to providing circuit designs for programmable integrated circuits (ICs) and, more particularly, to providing example designs with flexible configuration options. In accordance with the inventive arrangements described herein, one or more designs may be made available within an electronic design automation (EDA) system as examples. A user may choose an example design for implementation. Responsive to selecting an example design, the user may be provided with an opportunity to extend, reduce, and/or otherwise modify functionality of the selected example design. The user may make modifications prior to and/or at the time of generating the example design.

In one arrangement, the example designs may be provided in a format that generally includes a description and an implementation script. The EDA system may determine availability of example designs by detecting the description of the respective designs. The EDA system may present the example designs. An example design may be implemented through execution of the implementation script. Execution of the implementation script may cause the EDA system to perform various operations. These operations may include, but are not limited to, determining available configuration options for the circuit design, querying a user to select one or more configuration options, generating user interface(s) through which configuration options may be presented and user selections of configuration options may be received, determining dependencies among configuration options for the example circuit design, and/or controlling operation of the EDA system to create a circuit design. The EDA system may generate the circuit design using any user selected configuration options.

In one aspect, the inventive arrangements described herein may be implemented as a method or process performed by a data processing system. In another aspect, the inventive arrangements may be implemented as a data processing system having a processor. The processor, upon executing program code, may perform the operations described herein. In still another aspect, the inventive arrangements may be implemented as a non-transitory computer-readable storage medium storing program code that, when executed, causes a processor and/or a system to perform and/or initiate a method or process.

The inventive arrangements described within this disclosure may be used to provide example, or reference, circuit designs. For purposes of illustration, and not limitation, the inventive arrangements may be used by third-party circuit board vendors, computer-aided design (CAD) teams, third party circuit designers, and/or other users to provide circuit designs. A circuit board vendor, for example, may wish to provide one or more example designs that make use of various peripheral devices and/or interfaces on the circuit board. A CAD team of a hardware vendor that uses a programmable integrated circuit (IC) in hardware designs may use one or more well-tested base designs for the programmable IC that may be included in a library as example (or in this case reference) circuit designs. Third party designers and/or other users may wish to create one or more commonly used circuit designs for distribution, sale, and/or reuse.

Figure 1:
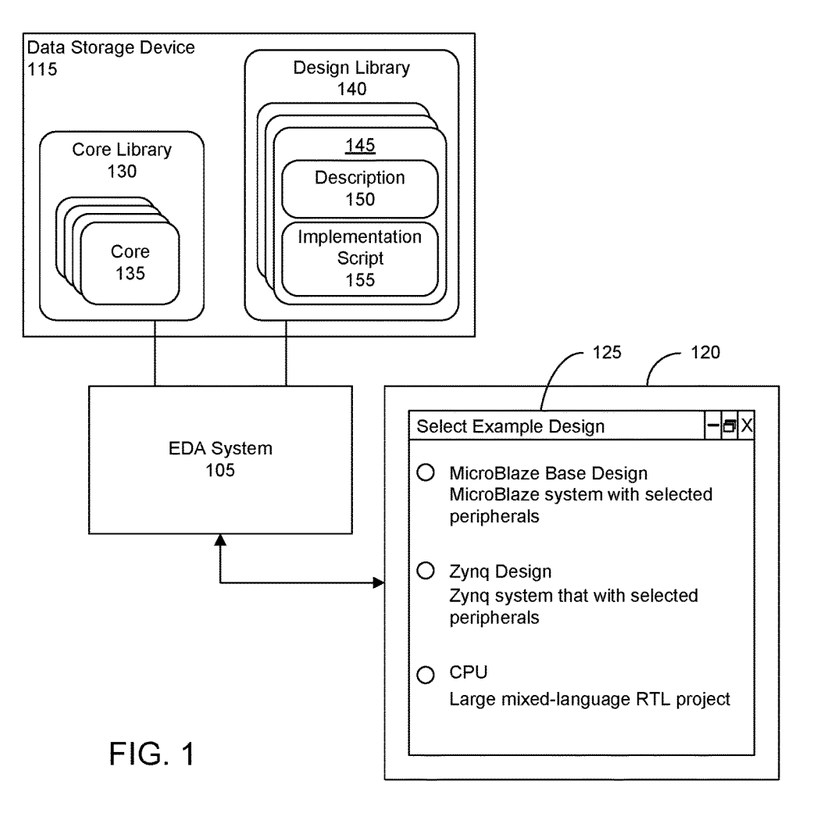
FIG. 1 is a block diagram illustrating an example of an electronic design automation system for use with the inventive arrangements described herein.

FIG. 1 is a block diagram illustrating an example of an EDA system for use with the inventive arrangements described herein. FIG. 1 illustrates an EDA system 105. EDA system 105 may be implemented as a data processing system, such as a computer, that is configured to execute program code. For example, EDA system 105 may execute an operating system (not shown) and an EDA application. In one aspect, the EDA application may include an interpreter. In another aspect, EDA system 105 may execute an interpreter in cooperation with the EDA application.

In general, an EDA application is a computer program or collection of computer programs that, responsive to execution, may perform functions such as instantiating cores of a circuit design, connecting ports of the cores, and performing other operations on circuit designs such as synthesis, placement, and/or routing. An EDA application further may generate a configuration bitstream that may be loaded into a programmable IC to implement a circuit design specified by the configuration bitstream within the programmable IC.

An interpreter is a computer program that, responsive to execution, may execute a script. In one aspect, an interpreter may parse source code of a script and directly execute, i.e., perform, instructions within the script without previously compiling the instructions into a machine language program. In another aspect, the interpreter may translate source code of a script into some intermediate representation and immediately execute the intermediate representation. The interpreter may operate in accordance with other known techniques for executing scripts and is not intended to be limited to the examples provided herein.

As pictured, EDA system 105 is coupled to a data storage device 115 and a display device 120. Within FIG. 1, data storage device 115 is shown as being separate and independent of EDA system 105. In another arrangement, data storage device 115 may be included within, or as part of, EDA system 105. Data storage device 115 may store a core library 130 including one or more cores 135. Data storage device 115 may also store a design library 140 including one or more designs 145. In one aspect, designs 145 may be used to create example and/or reference circuit designs.

In one arrangement, each of circuit designs 145 may include, or be formed of, a description 150 and an implementation script 155. Further, one or more portions of circuit designs 145 may refer to, or be built using, one or more of cores 135. In general, each description 150 may provide information about the circuit design. Each description 150 may specify one or more attributes about the circuit design that may be read by EDA system 105. In one aspect, description 150 may be specified using eXtensible Markup Language (XML).

Example 1 below illustrates an exemplary description 150.

Example 1

<Name>microblaze_base</Name>
<Version>1.1</Version>
<Library>internal</Library>
<Vendor>Vendor XYZ</Vendor>
<DisplayName>MicroBlaze Base Design</DisplayName>
<Location>def/mb_main.tcl</Location>
<Category>Base/IPI/Dummy</Category>

As shown in Example 1, each description 150 may specify one or more attributes. The attributes may include, but are not limited to, the name of the circuit design, a version number, the library in which the circuit design is stored, a vendor or other provider of the circuit design, a display name for the circuit design, a location where the implementation script of the circuit design is stored, and a category for the circuit design. The attributes shown in Example 1 are provided for purposes of illustration and are not intended as limitations. It should be appreciated that a description such as description 150 may include fewer or more attributes than those described.

In one arrangement, designs 145 may include only description 150 and implementation script 155. For example, designs 145 may not include any hardware description language (HDL), cores, circuit blocks, or connectivity. In this regard, designs 145 may be self-implementing in that a design 145 may be implemented entirely through execution of its implementation script 155.

In illustration, the design itself may query data sources to determine available interfaces of a circuit board. For example, responsive to a user specifying a particular circuit board, execution of the implementation script of a design may query a data source of EDA system 105 to find the interfaces available and other implementation details for the circuit board. The design may query and dynamically determine information needed for implementation of the circuit design given the circuit board specified by the user. In this example, the type of circuit board may be obtained from the user as an input, while the circuit board definitions may be stored within EDA system 105 or a library of definitions accessible by EDA system 105.

In one exemplary mode of operation, EDA system 105 may receive a user input requesting a list of available designs 145. Responsive to the user input, EDA system 105 may generate a UI 125 that may be displayed on display device 120. For purposes of illustration, UI 125 may be a graphical user interface (GUI). UI 125 may list the available circuit designs 145. In the example of FIG. 1, design library 140 includes three designs 145, each being listed in UI 125. In one aspect, EDA system 105 may search design library 140 for descriptions 150. EDA system 105 may display a portion of each detected description 150 of a design 145 within UI 125.

In one aspect, responsive to the user request for designs, EDA system 105 may read descriptions 150 of designs 145 in design library 140 and present the display name from each detected description 150 within UI 125 as a selectable option. As pictured, EDA system 105 may read the display name "MicroBlaze Base Design" from the description of Example 1 above and include the display name in UI 125. In another aspect, descriptions 150 may include descriptive text as an attribute that may also be displayed within UI 125 beneath, or in association with, the display name of each respective design 145.

A user may select one of designs 145 for implementation. Referring to FIG. 1, for example, a user may select a particular design 145 using UI 125. It should be appreciated, however, that while a GUI is illustrated, other UIs may be used. For example, the user may request a list of designs 145 through a command line interface and select a particular design 145 for implementation using the command line interface.

In one aspect, selection of a design 145 through UI 125, or another UI, may cause execution of implementation script 155 of the particular design 145 that is selected. For example, EDA system 105 may execute implementation script 155 for the selected design 145 according to the location, or path, information specified in description 150 of the selected design 145. Referring to Example 1 above, EDA system 105 would execute the implementation script named "mb_main.tcl" located in the "def" directory.

Figure 2:
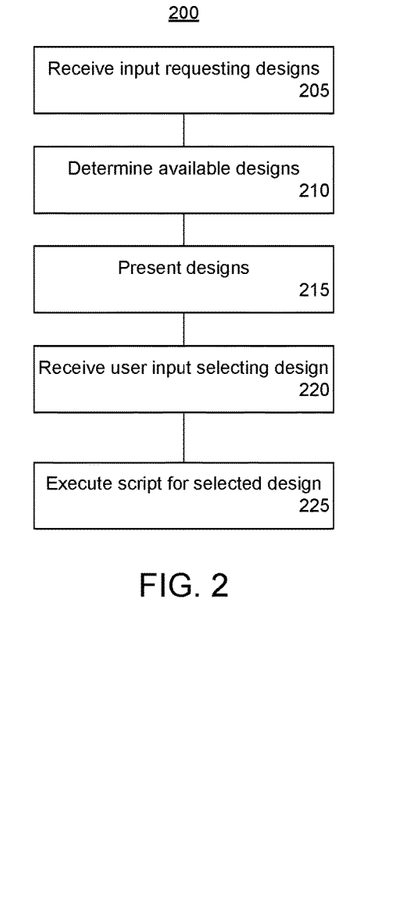
FIG. 2 is a flow chart illustrating an exemplary method of implementing a circuit design for a programmable IC.

FIG. 2 is a flow chart illustrating an exemplary method 200 of implementing a circuit design for a programmable IC. Method 200 may be implemented by an EDA system as described with reference to FIG. 1.

Method 200 may begin in block 205 where the EDA system receives an input requesting designs. The input may be received from a user and may request example designs that may be implemented as circuit designs. In block 210, the EDA system may determine available designs. The EDA system may determine designs that are available for use responsive to the input received in block 205. In one arrangement, the EDA system may search within a design library for descriptions, e.g., description files, of designs stored in the design library. Each description detected by the EDA system may represent a design that is available for use.

In block 215, the EDA system may present a list of the designs detected in block 210 through a UI. In one example, the EDA system may display the display name of each available design as determined from the description for the designs located in block 210. In block 220, the EDA system may receive an input selecting a design presented in block 215 for implementation. The input may be received from a user. In block 225, responsive to the input selecting the design, the EDA system may execute the implementation script of the selected design.

Figure 3:
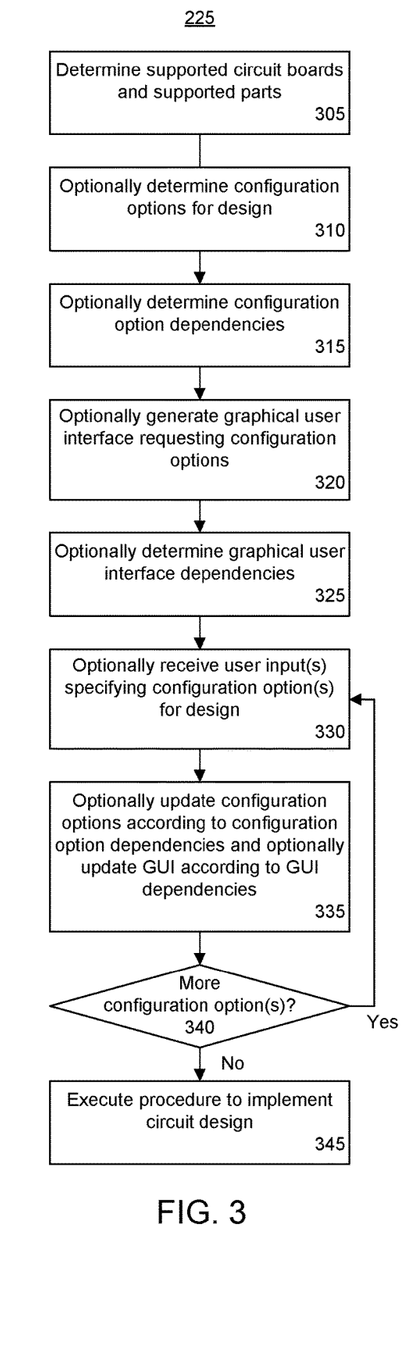
FIG. 3 is a flow chart illustrating another exemplary method of implementing a circuit design for a programmable IC.

FIG. 3 is a flow chart illustrating another exemplary method of implementing a circuit design for a programmable IC. More particularly, FIG. 3 illustrates exemplary operations that may be performed by the EDA system of FIG. 1 in executing the implementation script as described in block 225 of FIG. 2. The implementation script that is executed is for the design selected block 220 of FIG. 2. For purposes of discussion, each block of FIG. 3 may correspond to a portion of the implementation script that is being executed.

In one aspect, the EDA system may be programmed to search for and execute particular procedures within the implementation script. Further, the EDA system may be configured or programmed to execute the procedures of the implementation script in a specified order to effectuate the sequence and/or flow of operations described herein.

In block 305, the EDA system may determine supported circuit boards and supported parts for the design. The implementation script may specify supported circuit boards that may be used to mount or couple to the programmable IC used to implement the circuit design to be generated. The implementation script further may specify the particular parts, e.g., the particular programmable IC models, which may be used. The particular circuit board and programmable IC model used, for example, may dictate pin configurations of the circuit design and/or other configuration options for the circuit design.

In one aspect, supported circuit boards and/or parts may be specified statically by the implementation script. For example, the implementation script may declare or specify a list or other data structure specifying supported circuit boards and/or parts. In another aspect, supported circuit boards and/or parts may be determined dynamically through execution of the implementation script. In a dynamic process, the implementation script may include one or more procedures that, when executed by the system, query a data source specifying supported circuit boards and/or parts and return a list of the supported circuit boards and/or parts for the selected design. The procedure, for example, may query a data source within the EDA system that maintains a current list of supported circuit boards and/or parts as well as design information for the supported circuit boards and/or parts for the designs.

In one example, each supported circuit board may include a description file specifying properties such as pin layout of the circuit board, available electronic interfaces of the circuit board to which the programmable IC may be coupled, power and/or reset pins, clock signals and/or frequencies, and the like.

Example 2 below illustrates an exemplary portion of the implementation script for the design that may be executed to determine supported circuit boards and parts. The scripting language used in Example 2, and in the other exemplary portions of the implementation script provided within this disclosure, is Tcl. It should be appreciated, however, that any of a variety of different scripting languages may be used. As such, the inventive arrangements described within this specification are not intended to be limited to one particular scripting language.

Example 2 proc getSupportedBoards { } {
   return        [get_board_parts       -filter
     {PART_NAME!~"*xc7z*"        &&

```
    BOARD_NAME!~*adm_pcie-7v3*          &&
    VENDOR_NAME=="xilinx.com"}-latest_file_ver-
    sion]
}
proc getSupportedParts { } {
    return [list kintex7 kintex7{xc7k325tffg900-2}
kintex7{xc7k((160t.*ffg676.*(-
    (2|2L|3)))|(((325t)|(355t)|(410t)|(420t)|(480t)).*ffg.*(-
    (2|2L|3))))}]
}
```

In block 310, the EDA system may optionally determine one or more configuration options for the design. Example 3 below illustrates another exemplary portion of the implementation script for the design. Execution of the program code of Example 3 may cause the EDA system to retrieve the available configuration options for the design. The term "configuration options" is used within this disclosure to generally refer to the properties of parameters for which values may be set for the design.

Example 3

```
proc addOptions {designObject} {
    return [list [dict create name "Cparam1" type "string"
        value "test" min_value ""max_value"" enabled true]
        [dict create name "Cparam2" type "long" value "10"
            min_value "0" max_value "20" enabled true]
        [dict create name "Cparam3" type "long" value "10"
            value_list "a1, b1, c1" enabled true]
        . . .
        . . .
    ]
]
```

Within Example 3, the "addOptions" procedure, responsive to execution, may return a list of parameters and properties for the parameters for the design. In Example 3, each parameter is defined using the syntax: <param_name> <param_type> (string, long, bool, float) <param_default_value> <param_range_min> <param_range_max> <param_enablement>. As described herein in further detail, a user may provide values for properties of the parameter(s). The user provided values may determine, at least in part, configuration options for the design by specifying, among other things, which cores are instantiated for the circuit design, number of instances of cores to be instantiated, and connectivity among the instantiated cores. For purposes of illustration, the user may be permitted to provide values for parameters that control the number of processors to be included, whether a memory interface generator (MIG) is to be included, whether Ethernet is to be included, and/or whether a general purposes input/output (GPIO) is to be included within the design.

In block 310, the EDA system may optionally determine configuration option dependencies. The EDA system, for example, may determine dependencies that exist among different ones of the parameters and properties. In illustration, consider an example where a property of a parameter that specifies a type of Ethernet core, e.g., direct memory access (DMA) and/or first-in-first-out (FIFO), depends upon a Boolean property for a parameter indicating whether to include an Ethernet core in the design at all. Configuration option dependencies define relationships between dependent parameters and/or properties of parameters.

Example 4 below illustrates a portion of the implementation script for the circuit design that defines configuration option dependencies.

Example 4

```
updater {designObject   NUM_OF_PROCESSORS.
    VALUE}
{INCLUDE_UART.VALUE      INCLUDE_UART.EN-
    ABLEMENT} {
    if {${NUM_OF_PROCESSORS.VALUE}=="2"} {
        set ${INCLUDE_UART.VALUE} "false"
    }
    . . .
}
```

In Example 4, "updater" is a procedure that defines dependencies between properties of one or more different parameters of the circuit design. In Example 4, when the value property of the num_of_processors parameter for the circuit design becomes "2", the value property of the include_uart parameter becomes "false". The implementation script may define more or fewer dependencies that may automatically update particular value properties of parameters according to properties of other parameters and in accordance with the configuration options as determined in Example 3.

In block 320, the system may optionally determine a layout for a GUI that may be presented on a display device of the EDA system. The layout of the GUI may specify how the configuration options are to be presented to a user. Example 5 below illustrates another exemplary portion of the implementation script for the design. Execution of the program code of Example 5 may cause the EDA system to define a layout of a GUI. In one aspect, execution of the program code of Example 5 may cause the EDA system to display the GUI having the layout defined therein.

Example 5

```
proc addGUILayout {designObject} {
    set page [add_guipage -name "Page1" -display_name
        "Page 1"]
    add_param -name num_of_processors -display_name
        "Number of Processors" -parent $page
    #place to define GUI layout for options
    . . .
}
```

In Example 5 above, the procedure "addGUILayout" defines a layout for a GUI that may be displayed by the EDA system. The procedure sets a page named "Page1". The page named "Page1" includes a parameter named "num_of_processors". The GUI defined in the program code of Example 5 may specify one or more of the configuration options, e.g., attributes of the parameters, for the circuit design. In one arrangement, the GUI defined by Example 5 may specify and/or present configuration options, e.g., attributes of parameters, originally specified in the "addOptions( )" function of Example 3 above. The user may provide values for the configuration options. The EDA system may generate a GUI that includes a GUI element for each different parameter defined for the GUI layout, thereby allowing the user to provide or specify values for the attributes using the GUI.

In block 325, the EDA system may optionally determine GUI dependencies. Further, the EDA system may adjust the appearance of the GUI in accordance with the GUI dependencies. The implementation script may include procedures that specify dependencies among the properties of GUI elements of the GUI as defined in the layout. Example 6 below illustrates another portion of the implementation script for the circuit design. Execution of the program code of Example 6 may cause the EDA system to modify and/or adjust the layout of the GUI that is generated and/or displayed.

Example 6

```
gui_updater {designObject NUM_OF_PROCESSOR.
    VALUE}
{INCLUDE_UART.VISIBILITY    INCLUDE_UART.
    TOOLTIP} {
  if {${NUM_OF_PROCESSORS.VALUE}]=="2"} {
    set ${INCLUDE_UART.VISIBILITY} "false"
  }
  . . .
}
```

The program code of Example 6 may define dependencies between properties of parameters and properties of GUI elements of the GUI. For example, the properties of a GUI element may specify visibility, tooltips for the GUI element such as a page, groupings of GUI elements, and the like. In Example 6, when the value property of the number_of_processors parameter becomes "2", the GUI element corresponding to the "include_uart" parameter is hidden.

In block 330, the EDA system may optionally receive one or more user inputs. The user inputs may specify a particular circuit board and/or part. Further, the user inputs may specify configuration options for the design. More particularly, the user inputs may specify values for properties of parameters of the design. In one aspect, the user inputs may be received through the GUI. It should be appreciated, however, that user specified values may be received in any of a variety of different ways whether through a batch file, a command line, or the like.

In block 335, the EDA system may optionally update configuration options according to the configuration option dependencies and optionally update the GUI according to the GUI dependencies. The EDA system, for example, may perform the updates based upon user specified values received in block 330.

In block 340, the EDA system may determine whether there are more configuration options to be specified. In one aspect, the user may provide a command or instruction, whether through the GUI or via another user input mechanism, indicating that the user has finished providing configuration options and wishes to create the circuit design. It should be appreciated that the various configuration options described herein may have default values that may be used in the absence of any received user input.

In block 345, responsive to determining that no further configuration options are to be specified and/or responsive to a user request for implementation of the circuit design, the EDA system may execute a procedure to implement the circuit design. Example 7 below illustrates a portion of the implementation script that may be executed to implement the circuit design.

Example 7

```
proc createDesign {parent options} {
  set_property target_language VHDL [current_project]
  set_property "simulator_language" "Mixed" [current_
    project]
  . . .
  create_bd_cell -type ip -vlnv xilinx.com:ip:microblaze
    microblaze_0
  apply_bd_automation -rule xilinx.com:bd_rule:micro-
    blaze -config {local_mem "8 KB" get_bd_cells
    microblaze_0]
  apply_board_connection -board_interface "sys_diff_
    clock" -ip_intf "/clk_wiz_1/CLK
  apply_board_connection -board_interface "reset" -ip_
    intf "/clk_wiz_1/reset" -diag
  apply_board_connection -board_interface "reset" -ip_
    intf "/rst_clk_wiz_1_100M/ext
  create_bd_cell -type ip -vlnv xilinx.com:ip:axi_uartlite
    axi_uartlite_0
  apply_board_connection           -board_interface
    $rs232_interface -ip_intf "axi_uartlite_0
  create_bd_cell -type ip -vlnv xilinx.com:ip:axi_gpio
    axi_gpio_0
  apply_board_connection -board_interface $led_inter-
    face -ip_intf "axi_gpio_0/GPIO"
  apply_bd_automation   -rule  xilinx.com:bd_rule:axi4-
    config {Master "/microblaze_0
  apply_bd_automation   -rule  xilinx.com:bd_rule:axi4-
    config {Master "/microblaze_0
  . . .
}
```

In one arrangement, in block 345, the EDA system may call a function, or program code, illustrated above. In calling the function, the EDA system may also provide the configuration options, e.g., properties, whether default, specified by the user, or determined through property dependencies, to the procedure. The program code of Example 7 utilizes scripting commands of the EDA system, available to users, to create the circuit design.

For example, the procedure "createDesign" may create a circuit design project within the EDA system. In one aspect, creating a circuit design project may create a circuit design data structure in program execution memory of the EDA system. The instruction "create_bd_cell" creates an instance of a core. In this example, the "create_bd_cell" creates an instance of the MicroBlaze core from the core library. Referring to the user specified configuration options, the EDA system may determine how many processors the user selected. If the user selected one processor, for example, the EDA system implements one MicroBlaze processor core using one "create_bd_cell" command. If the user selected two processors, the EDA system implements two Micro-Blaze processor cores using two "create_bd_cell" commands. The EDA system, for example, may implement one "create_bd_cell" per processor specified.

The "apply_bd_automation" command causes the EDA system to apply an automated connection operation to connect two cores, two interfaces on cores, clocks for cores, and resets for cores. Using the "apply_bd_automation" command automatically connects cores as described without a user having to individually add nets for each of the different signal connections. It should be appreciated, that these automated connection operations may be circuit board dependent.

As pictured, the "create_bd_cell" command is also used to instantiate a UART core and a GPIO core. As used within this disclosure, the term "instantiate" means to create an instance of an object, e.g., a core or a circuit design, in program execution memory of a data processing system. It should be appreciated that the various commands for instantiating cores and automatically connecting the cores illustrated in Example 7 are available within the EDA system and invoked through execution of the implementation script.

The program code of Example 7 may include additional program code that may make decisions based upon the configuration options as to which instructions to execute and the like. Example 8 illustrates additional program code that may be included as part of the program code of Example 7.

Example 8

```
If(options.getParamValue (num_processors)==1){
//create one microblaze
} else if (options.getParamValue (num_processors)==2){
//create two microblaze
}
```

Example 8 illustrates decisional instructions that would cause the EDA system to instantiate a particular number of processors based upon the configuration options received as parameters.

The resulting output of the EDA system is an implemented circuit design generated from the selected design. In one aspect, the circuit design, once generated as described in FIGS. 2 and 3, may be specified in a format such as a collection of instantiated cores, e.g., as a block level circuit design, specifying signal connections, e.g., connectivity, among the various blocks as described above. In another aspect, the circuit design, once generated as described in FIGS. 2 and 3, may be specified using HDL. Whether described as HDL or in another form, the generated circuit design may be stored in a persistent storage device. Once generated, the circuit design may be synthesized, placed, routed, and output as a configuration bitstream for implementation within the programmable IC. It should be appreciated that outputting the circuit design in this format allows the user to specify various other options during synthesis, placement, and/or routing to improve timing, improve power consumption, or the like.

In another arrangement, a design creator, having created a description and implementation script for a design, may instruct the EDA system to read the design, store the design, and make the design available within a library of example designs as illustrated in FIG. 1. For example, the user may provide a command line input, or other input, such as "add_example_design <design_path>" which may cause the EDA system to read the description and implementation script and store the files as an example design in a library for access by an end user and/or one or more other users. Accordingly, responsive to the received user input, the EDA system may automatically import the design, which may include the description and the implementation script referenced by the description, within an example library of the EDA system.

Figure 4:
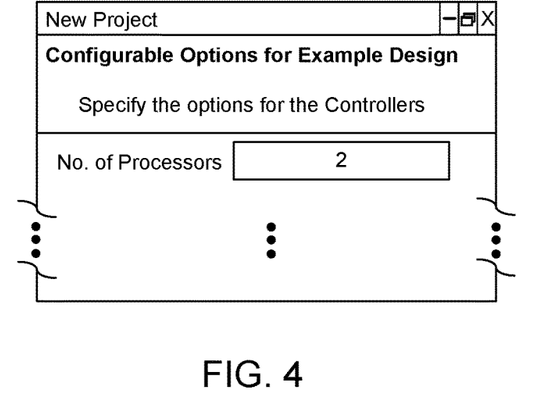
FIG. 4 is a block diagram illustrating an exemplary graphical user interface.

FIG. 4 is a block diagram illustrating an exemplary GUI 400. GUI 400 may be generated responsive to execution of an implementation script of a design. GUI 400 may generally correspond to Example 5. The "set page" instruction of Example 5, for example, may create a page of GUI 400. The "add_param" instruction may generate a GUI element allowing a user to specify the number of processors that are to be included in the design. In this example, the GUI dependencies prevent visibility of the GUI element relating to inclusion of a UART since the number of processors specified is 2.

Figure 5:
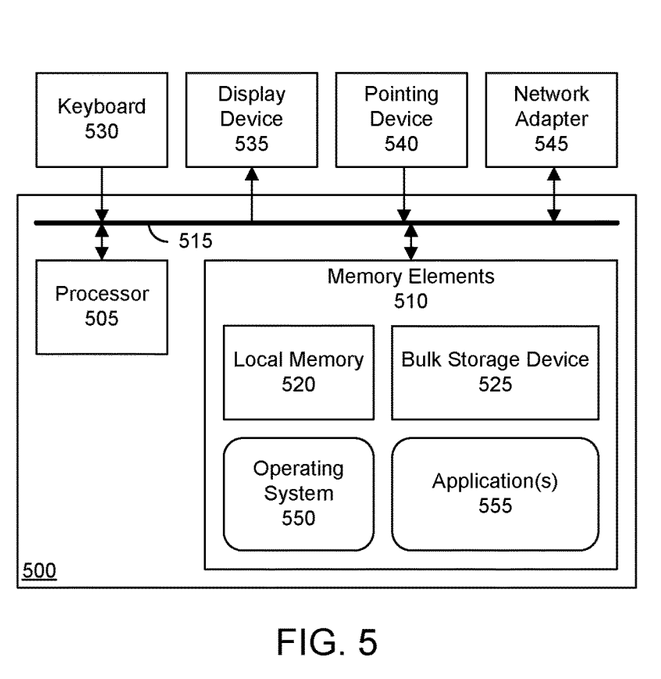
FIG. 5 is a block diagram illustrating an exemplary architecture for a data processing system.

FIG. 5 is a block diagram illustrating an exemplary architecture 500 for a data processing system. Architecture 500 may be used to implement systems and/or devices that include a processor and memory and that are capable of performing the operations described within this disclosure. Architecture 500, or a variant of architecture 500, may be used to implement EDA system 105 of FIG. 1. In some cases, the particular system implemented using architecture 500 may include fewer components or more components than illustrated in FIG. 5. Further, the particular operating system and/or application(s) included may vary.

As pictured, architecture 500 includes at least one processor, e.g., a central processing unit (CPU), 505 coupled to memory elements 510 through a system bus 515 or other suitable circuitry. Architecture 500 stores computer-readable program instructions (also referred to as "program code") within memory elements 510. Memory elements 510 may be considered an example of computer readable storage media. Processor 505 executes the program code accessed from memory elements 510 via system bus 515. In one aspect, memory elements 510 include one or more physical memory devices such as, for example, a local memory 520 and one or more bulk storage devices 525. Local memory 520 refers to random access memory (RAM) or other non-persistent memory device(s) generally used during actual execution of the program code. Bulk storage device 525 may be implemented as a hard disk drive (HDD), solid state drive (SSD), or other persistent data storage device. Architecture 500 may also include one or more cache memories (not shown) that provide temporary storage of at least some program code in order to reduce the number of times program code must be retrieved from bulk storage device 525 during execution.

Input/output (I/O) devices such as a keyboard 530, a display device 535, and a pointing device 540 may optionally be coupled to architecture 500. In some cases, one or more of the I/O devices may be combined as in the case where a touchscreen is used as display device 535. In that case, display device 535 may also implement keyboard 530 and/or pointing device 540.

The I/O devices may include one or more network adapters 545 that may be coupled to architecture 500 to enable architecture 500 to become coupled to other systems, computer systems, remote printers, and/or remote storage devices through intervening private or public networks and/or through direct connections (e.g., peer-to-peer connections). Modems, cable modems, Ethernet cards, and wireless transceivers (e.g., wireless radios) are examples of different types of network adapter 545 that may be used with architecture 500. Depending upon the particular system implemented with architecture 500, the specific type of network adapter, or network adapters as the case may be, will vary.

As pictured in FIG. 5, memory elements 510 store an operating system 550 and one or more applications 555. In one aspect, operating system 550 and application 555, being implemented in the form of program code, are executed by architecture 500. For example, processor 505 may execute operating system 550 and/or application 555. As such, operating system 550 and application 555 may be considered an integrated part of architecture 500. Operating system 550, application 555, and any data items used, generated, and/or operated upon by architecture 500 are functional data structures that impart functionality when employed as part of a system or device implemented using architecture 500.

In one arrangement, application 555 may be an EDA application. As discussed, the EDA application may execute cooperatively with, or include, an interpreter. In one arrangement, the interpreter may be part of a component of the EDA application that is configured to operate and/or process cores. For example, the interpreter may be configured to provide script-based and/or graphical circuit development that includes rules ensuring correct connections between cores.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "core" means a pre-designed and reusable unit of logic, cell, or chip layout design in the field of electronic circuit design. A core, sometimes referred to as an "Intellectual Property Core" or "IP," is expressed programmatically as a description of hardware that performs a particular function. A core may be expressed using hardware description language file(s), as a netlist, as a bitstream that programs a programmable IC, or the like. A core may be used as a building block within an application-specific integrated circuit chip design or within a programmable IC circuit design, e.g., an FPGA circuit design.

A core further may include additional resources such as source code, high level programming language models, schematics, documentation, and the like. Examples of different varieties of cores include, but are not limited to, digital signal processing (DSP) functions, memories, storage elements, math functions, etc. Some cores include an optimally floorplanned layout targeted to a specific family of ICs. Cores also may be parameterizable in that a user may enter parameters to activate or change certain functionality of a core.

As defined herein, the term "hardware description language" is a computer-language that facilitates the documentation, design, and manufacturing of a digital system, such as an integrated circuit. A hardware description language, or HDL, combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high level programming languages, an HDL also includes an explicit notion of time, which is a primary attribute of a digital system.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of implementing a circuit design may include, responsive to a user input selecting a design, executing an implementation script of the design using a processor, wherein executing the implementation script generates instructions for creating the circuit design. The method may include, responsive to the instructions, automatically instantiating cores of the design and connecting the instantiated cores using the processor.

Executing the implementation script may include requesting a user input selecting a first configuration option from a plurality of first configuration options for the design. In one aspect, the plurality of first configuration options may be determined from execution of the implementation script. For example, execution of the implementation script may query a data repository of a data storage device for the plurality of available first configuration options.

In another arrangement, responsive to receiving the user input, the method may include performing at least one of the instantiating cores or connecting the instantiated cores according to the selected first configuration option.

The method may include determining a dependence between the first configuration option and a second configuration option of the design. For example, a second configuration option may be selected automatically from a plurality of second configuration options according to a first configuration option selected from a plurality of first configuration options. The method may include performing at least one of the instantiating cores or connecting the cores according to the selected first configuration option and the selected second configuration option.

The method may include requesting a user input specifying a configuration option by displaying a GUI having a layout specified by the implementation script. In another arrangement, the method may include modifying the GUI responsive to receiving the user input specifying a selected first configuration option.

The method may also include, responsive to a received user input, automatically importing a design including a description and the implementation script within an example library of an EDA system, wherein the implementation script is referenced by the description.

A non-transitory computer-readable storage medium may have instructions stored thereon which, when executed by a processor, perform a method of implementing a circuit design as described herein.

A system may include a processor programmed to initiate executable operations. The executable operations may include the various operations described within this disclosure for implementing a circuit design from a design.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of implementing a circuit design, comprising:
   executing an implementation script for a selected design using a processor;
   wherein executing the implementation script generates instructions for creating the circuit design; and
   responsive to the instructions, automatically instantiating a plurality of cores of the design and connecting the instantiated plurality of cores using the processor;
   wherein the implementation script specifies a first core of the plurality of cores and a second core of the plurality of cores, and is configured to update a value property of a parameter of the second core based upon a user specified value property of a parameter of the first core; and
   wherein the circuit design is configured for implementation within an integrated circuit.

2. The method of claim 1, wherein executing the implementation script comprises:
   requesting a user input selecting a first configuration option from a plurality of first configuration options for the design.

3. The method of claim 2, wherein the plurality of first configuration options are determined from execution of the implementation script.

4. The method of claim 3, wherein execution of the implementation script queries a data repository of a data storage device for the plurality of available first configuration options.

5. The method of claim 4, wherein the plurality of available first configuration options include supported circuit boards for the integrated circuit.

6. The method of claim 1, wherein the implementation script is configured to selectively instantiate the second core based upon the user provided value property of the first core.

7. The method of claim 6, further comprising:
   selecting a second configuration option from a plurality of second configuration options according to a first configuration option selected from a plurality of first configuration options.

8. The method of claim 6, further comprising:
   performing at least one of the instantiating cores or connecting the cores according to which of the plurality of cores is instantiated.

9. The method of claim 1, further comprising:
   displaying a graphical user interface having a layout specified by the implementation script.

10. The method of claim 9, wherein the implementation script is configured to modify the layout of the graphical user interface responsive to receiving a user specified configuration option provided to the graphical user interface.

11. The method of claim 10, wherein the implementation script is configured to modify the layout by controlling visibility of a graphical user interface element based upon the user specified configuration option.

12. A non-transitory computer-readable storage medium having instructions stored thereon which, when executed by a processor, perform a method of implementing a circuit design, comprising:
   executing an implementation script for a selected design using the processor;
   wherein executing the implementation script generates instructions for creating the circuit design; and
   responsive to the instructions, automatically instantiating a plurality of cores of the design and connecting the instantiated plurality of cores using the processor;
   wherein the implementation script specifies a first core of the plurality of cores and a second core of the plurality of cores, and is configured to update a value property of a parameter of the second core based upon a user specified value property of a parameter of the first core; and
   wherein the circuit design is configured for implementation within an integrated circuit.

13. The non-transitory computer-readable storage medium of claim 12, wherein executing the implementation script comprises:
   requesting a user input selecting a first configuration option from a plurality of first configuration options for the design.

14. The non-transitory computer-readable storage medium of claim 13, wherein the plurality of first configuration options are determined from execution of the implementation script.

15. The non-transitory computer-readable storage medium of claim 14, wherein execution of the implementation script queries a data repository of a data storage device for the plurality of available first configuration options.

16. The non-transitory computer-readable storage medium of claim 15, wherein the plurality of available first configuration options include supported circuit boards for the integrated circuit.

17. The non-transitory computer-readable storage medium of claim 13, wherein the implementation script is configured to selectively instantiate the second core based upon the user provided value property of the first core.

18. The non-transitory computer-readable storage medium of claim 17, further comprising:
  selecting a second configuration option from a plurality of second configuration options according to a first configuration option selected from a plurality of first configuration options.

19. The non-transitory computer-readable storage medium of claim 17, further comprising:
  performing at least one of the instantiating cores or connecting the cores according to which of the plurality of cores is instantiated.

20. The non-transitory computer-readable storage medium of claim 12, further comprising:
  displaying a graphical user interface having a layout specified by the implementation script.

* * * * *